SIGNAL PROCESSING FOR REPRODUCING MAGNETICALLY RECORDED TELEVISION SIGNALS
Filed Aug. 17, 1964
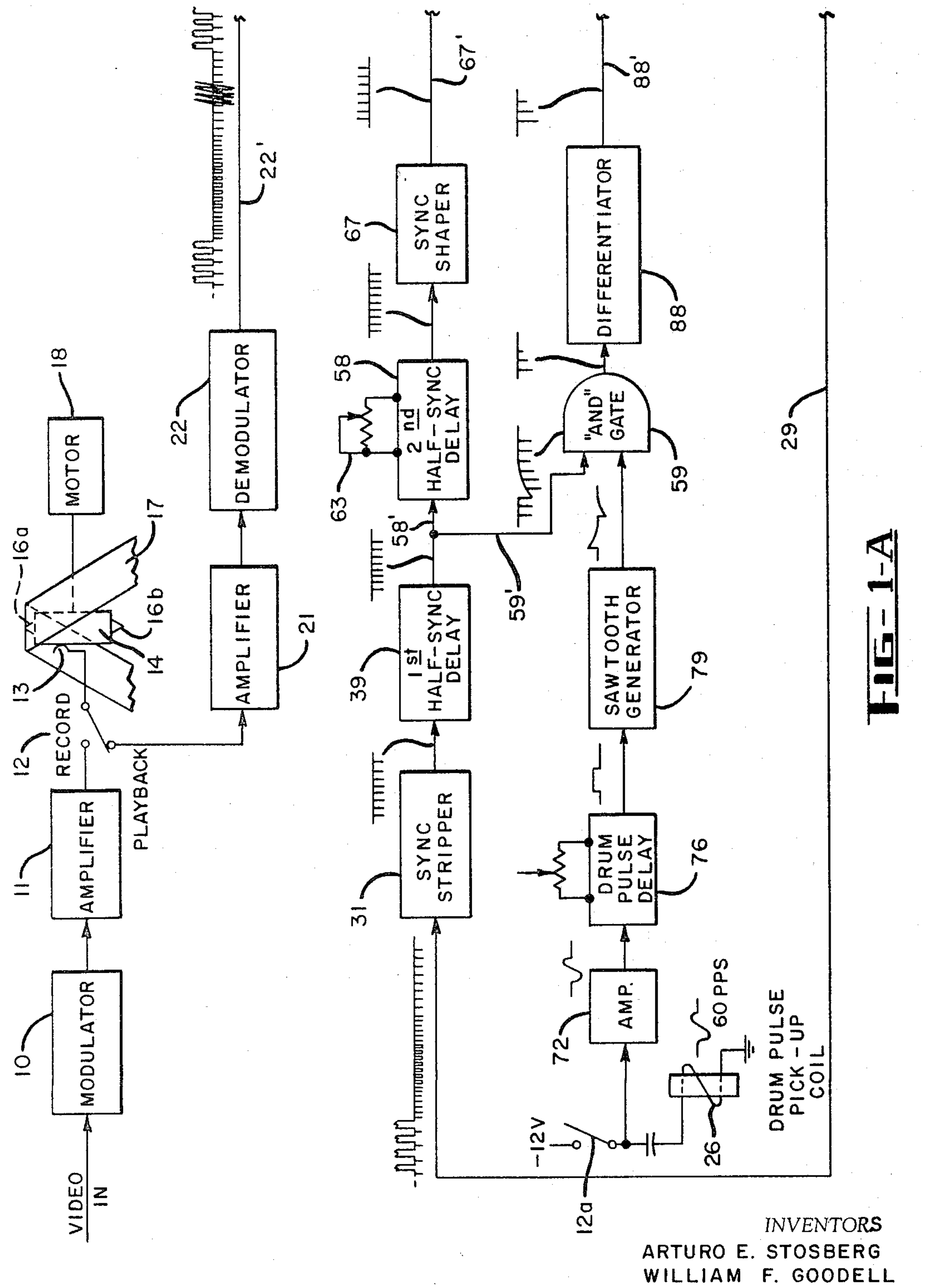
FIG-1-A
INVENTORS
ARTURO E. STOSBERG
WILLIAM F. GOODELL
BY Edward B. Ing
ATTORNEY

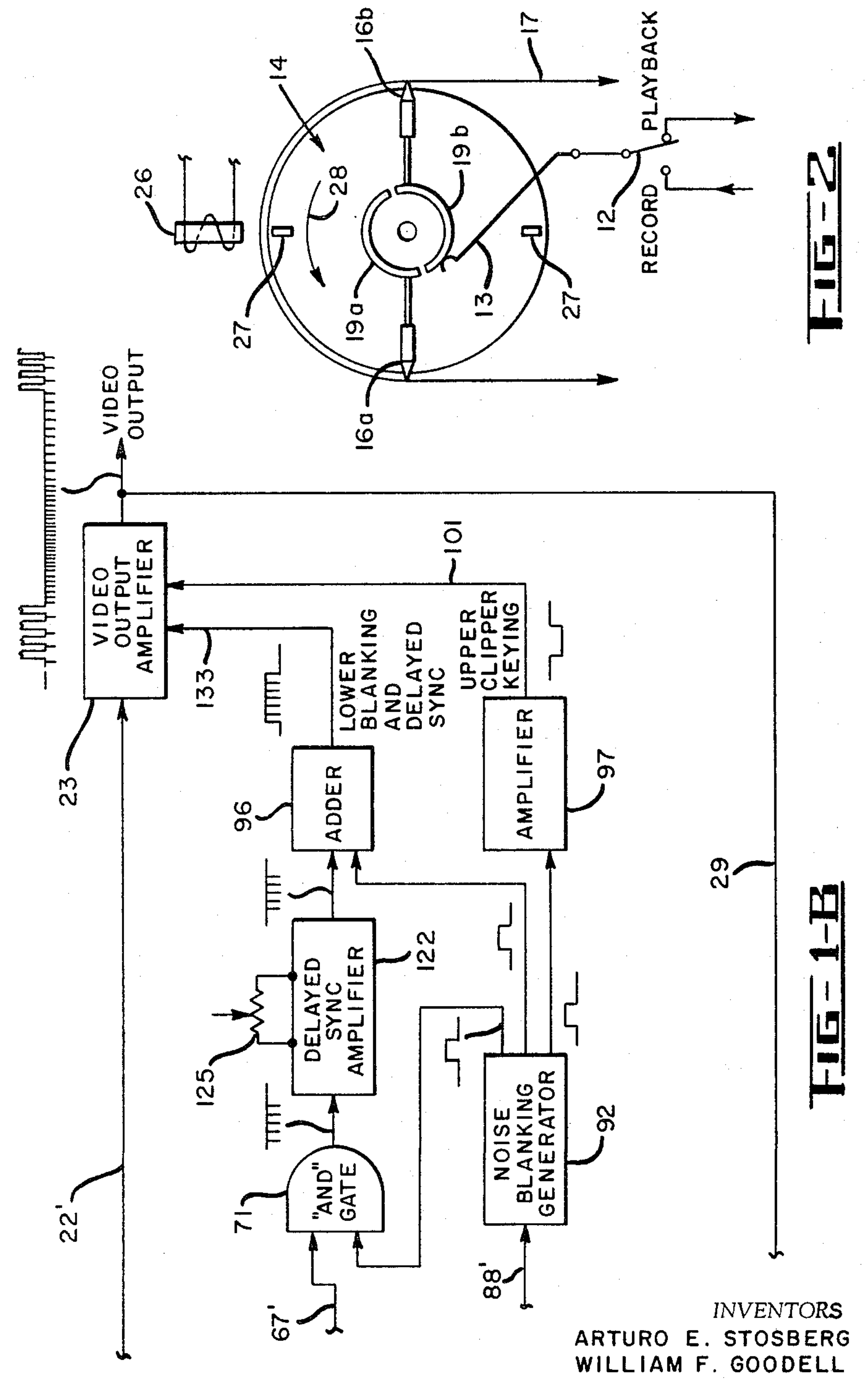
FIG-1-B, FIG-2
INVENTORS
ARTURO E. STOSBERG
WILLIAM F. GOODELL
BY Edward B. Gray
ATTORNEY

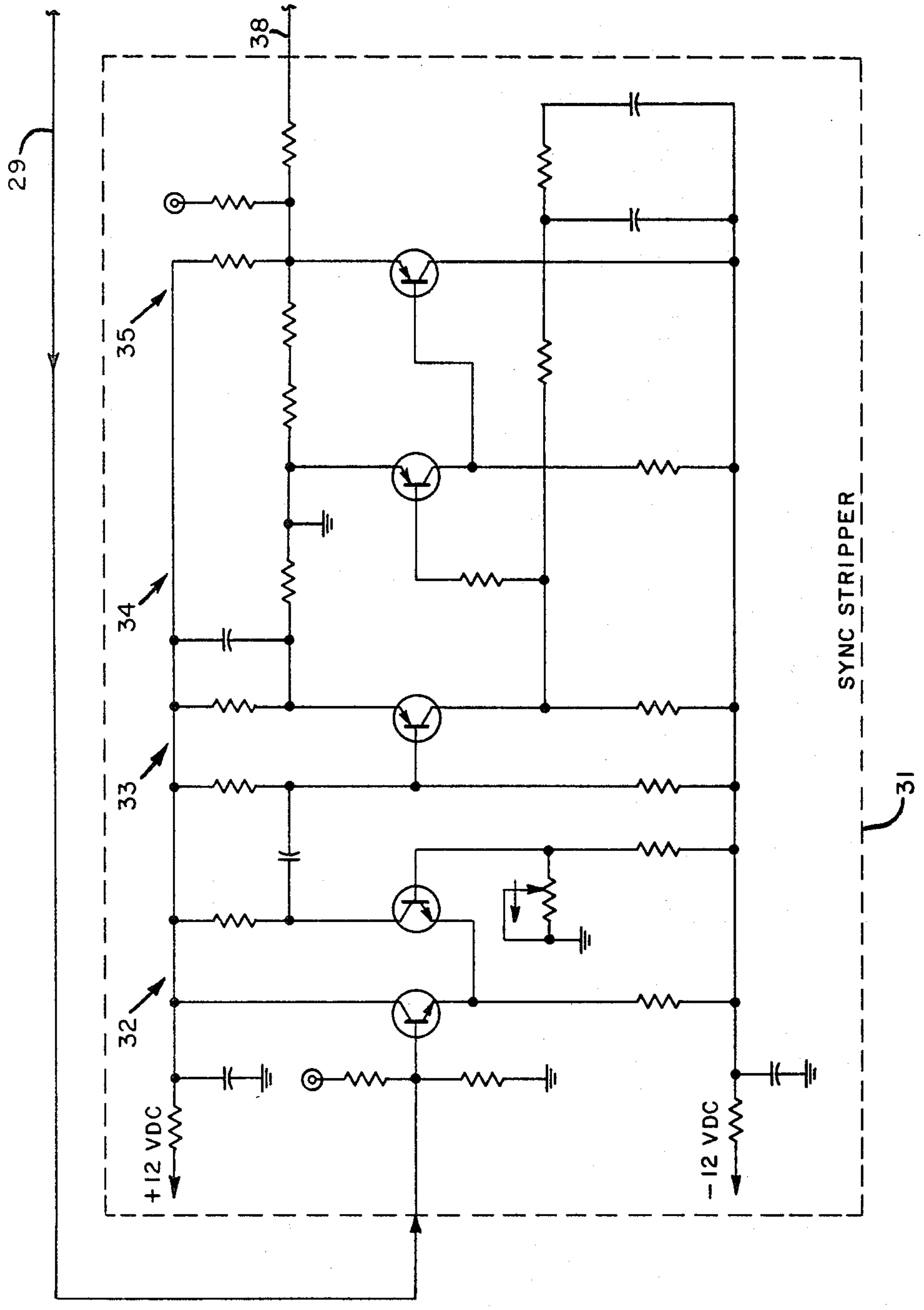
FIG-3-A
INVENTORS
ARTURO E. STOSBERG
WILLIAM F. GOODELL
BY Edward B. Gray
ATTORNEY

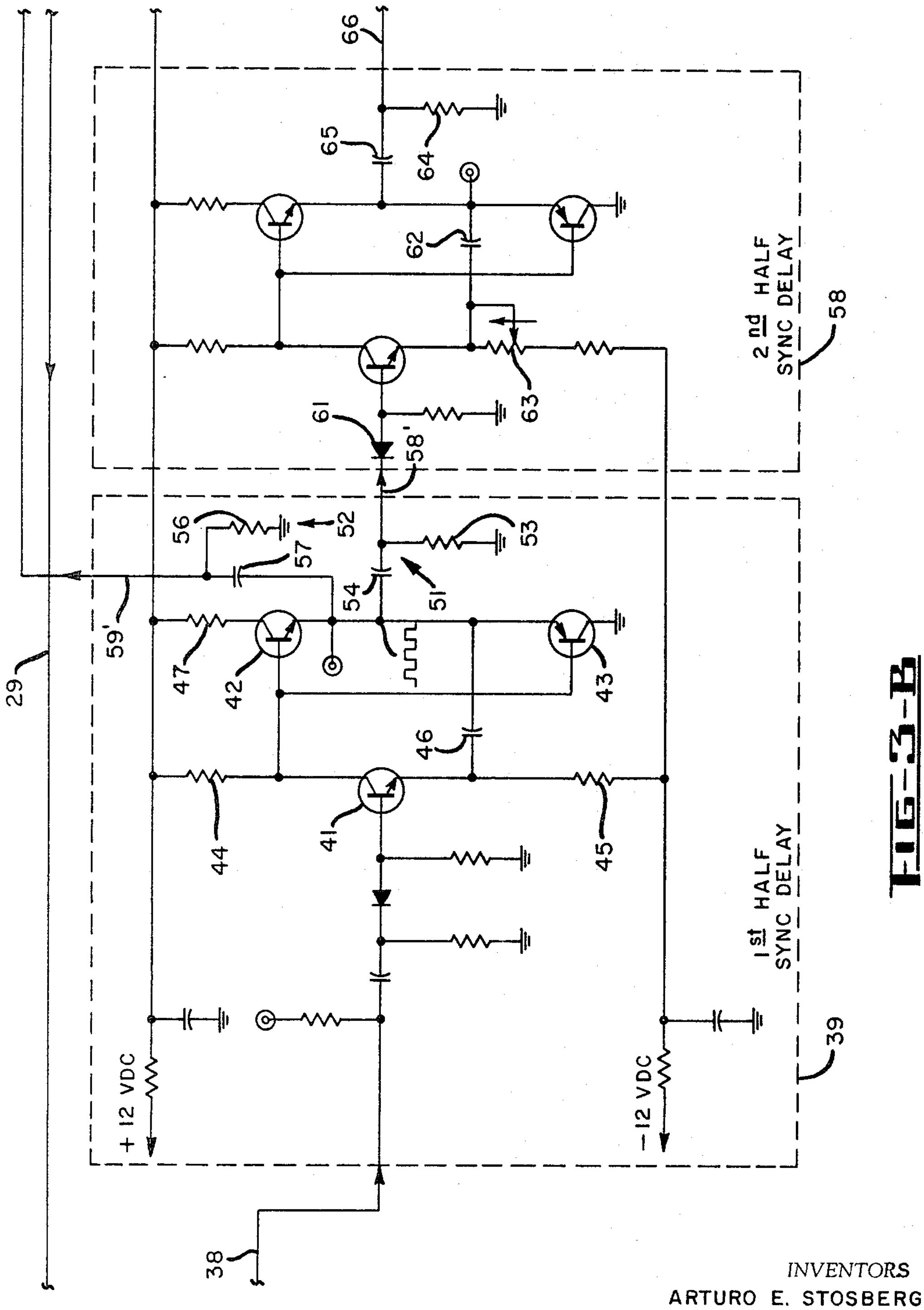
FIG-3-B
INVENTORS
ARTURO E. STOSBERG
WILLIAM F. GOODELL
BY [signature]
ATTORNEY

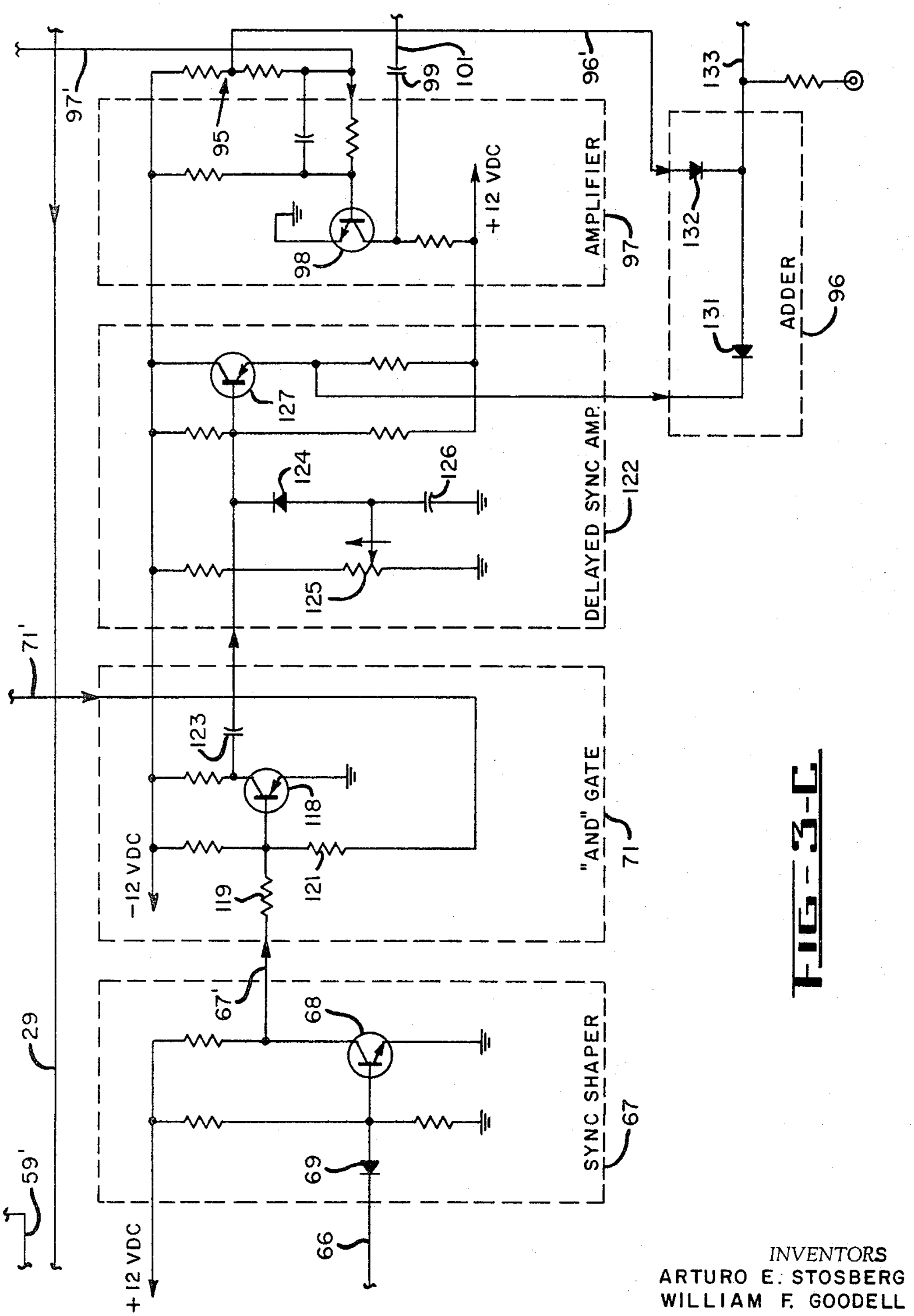
FIG-3-C
INVENTORS
ARTURO E. STOSBERG
WILLIAM F. GOODELL
BY Edward B. Gregg
ATTORNEY

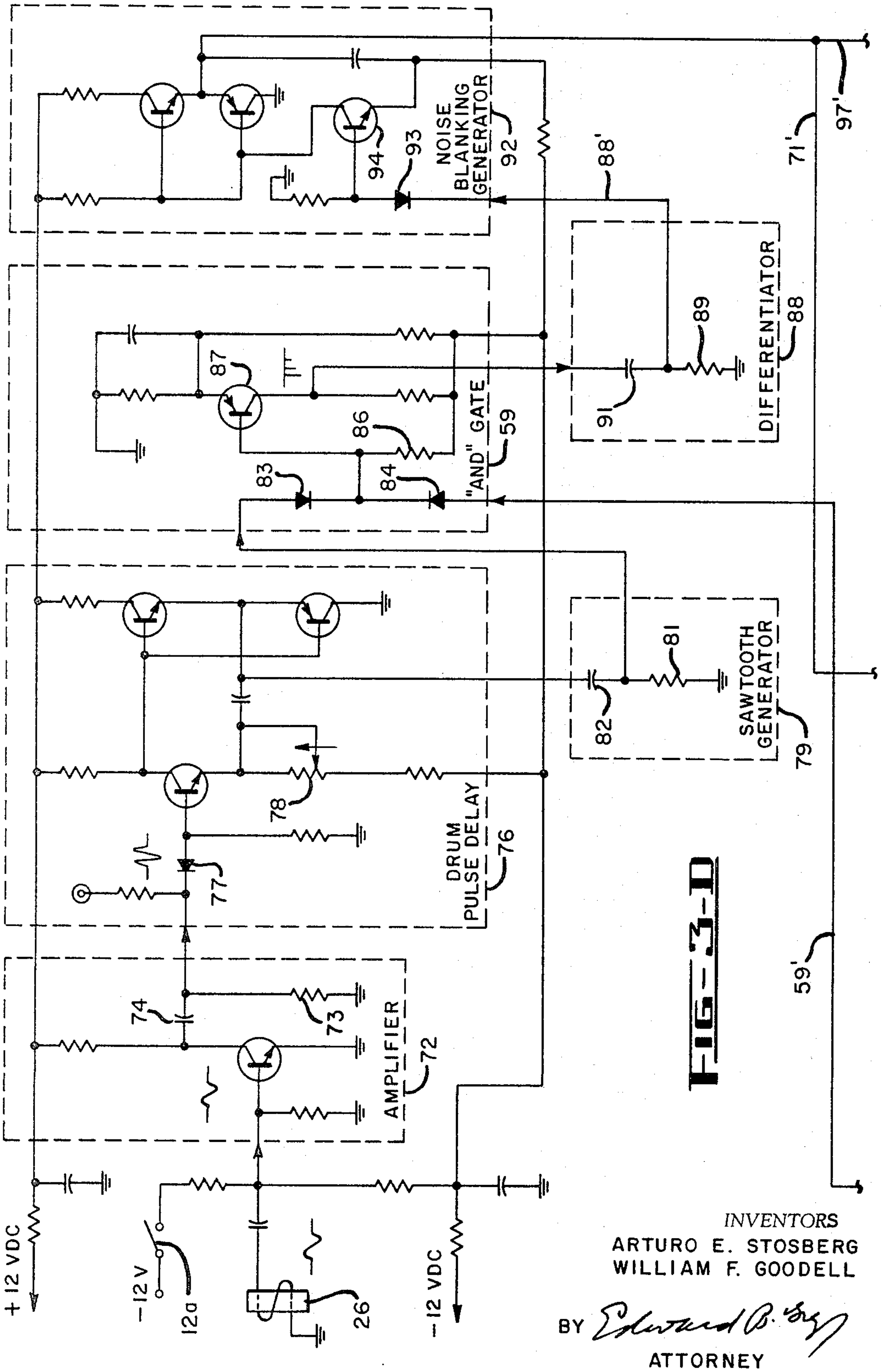
FIG-3-D
INVENTORS
ARTURO E. STOSBERG
WILLIAM F. GOODELL
BY Edward B. [signature]
ATTORNEY

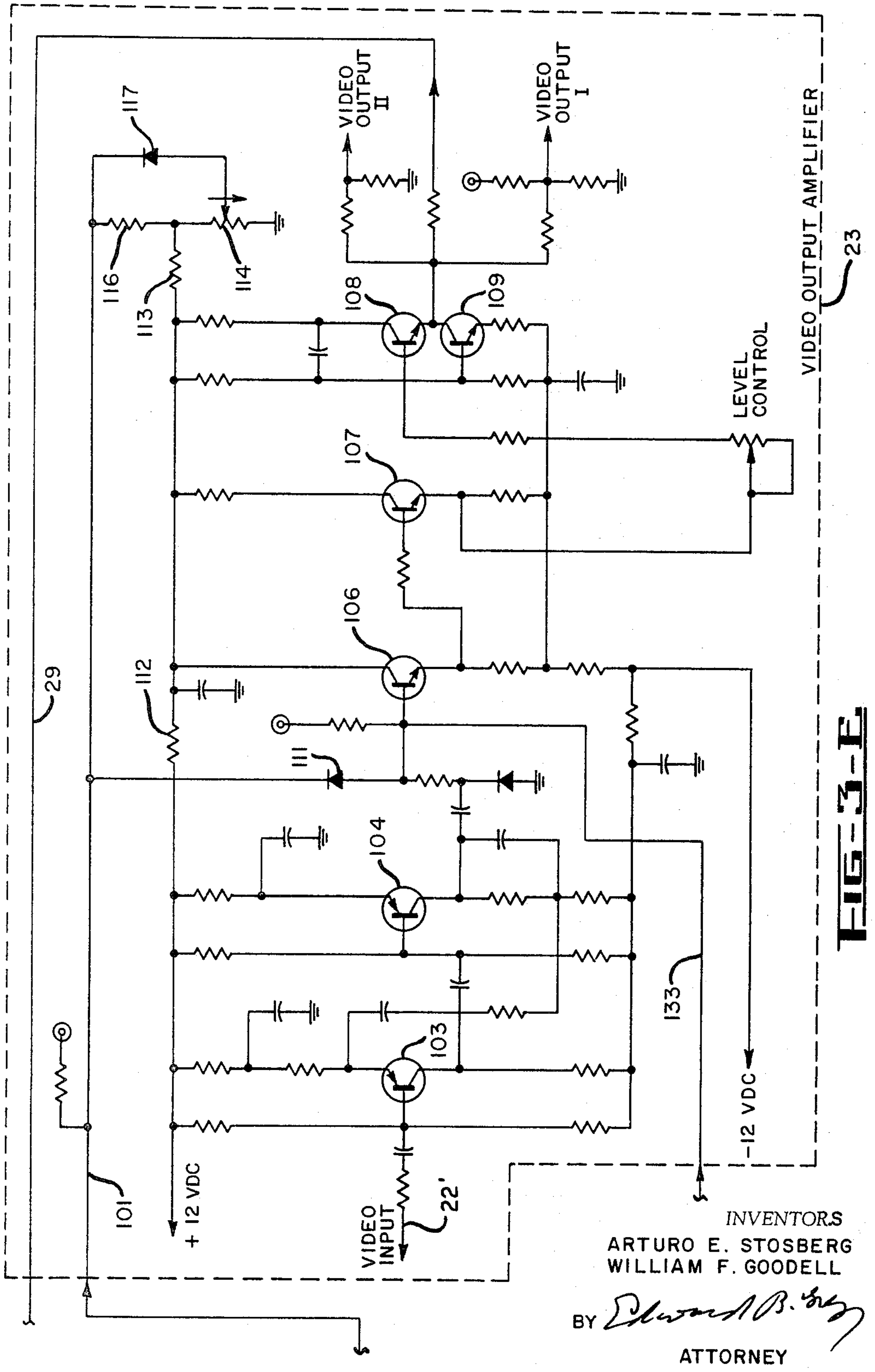
FIG-3-E
INVENTORS
ARTURO E. STOSBERG
WILLIAM F. GOODELL
BY Edward B. [signature]
ATTORNEY

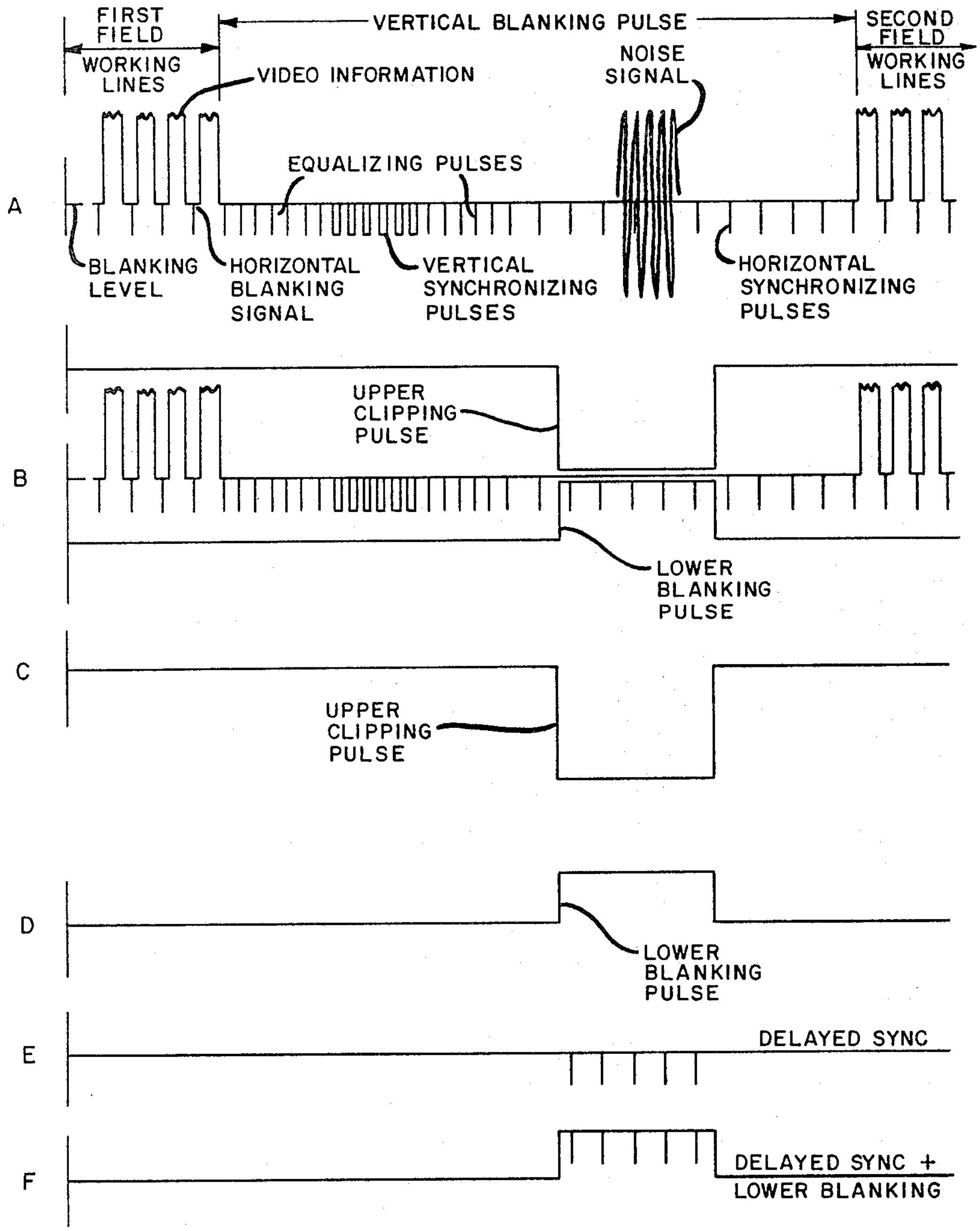
FIG-4-A
INVENTORS
ARTURO E. STOSBERG
WILLIAM F. GOODELL
BY Edward B. Gregg
ATTORNEY May 14, 1968 W. F. GOODELL ETAL 3,383,463
SIGNAL PROCESSING FOR REPRODUCING MAGNETICALLY RECORDED TELEVISION SIGNALS
Filed Aug. 17, 1964
11 Sheets-Sheet 9
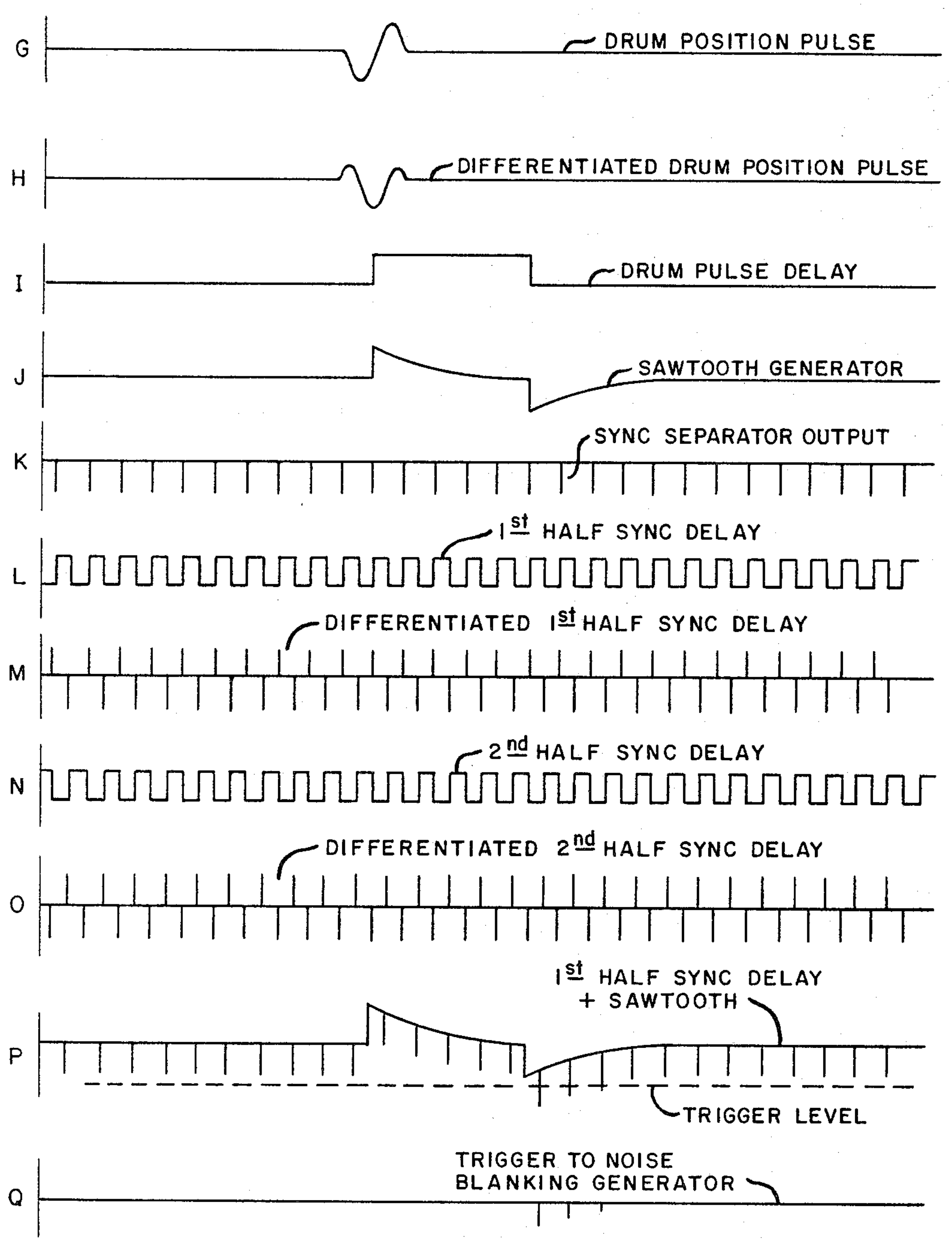
FIG-4-B
INVENTORS
ARTURO E. STOSBERG
WILLIAM F. GOODELL
BY Edward B. Gray
ATTORNEY

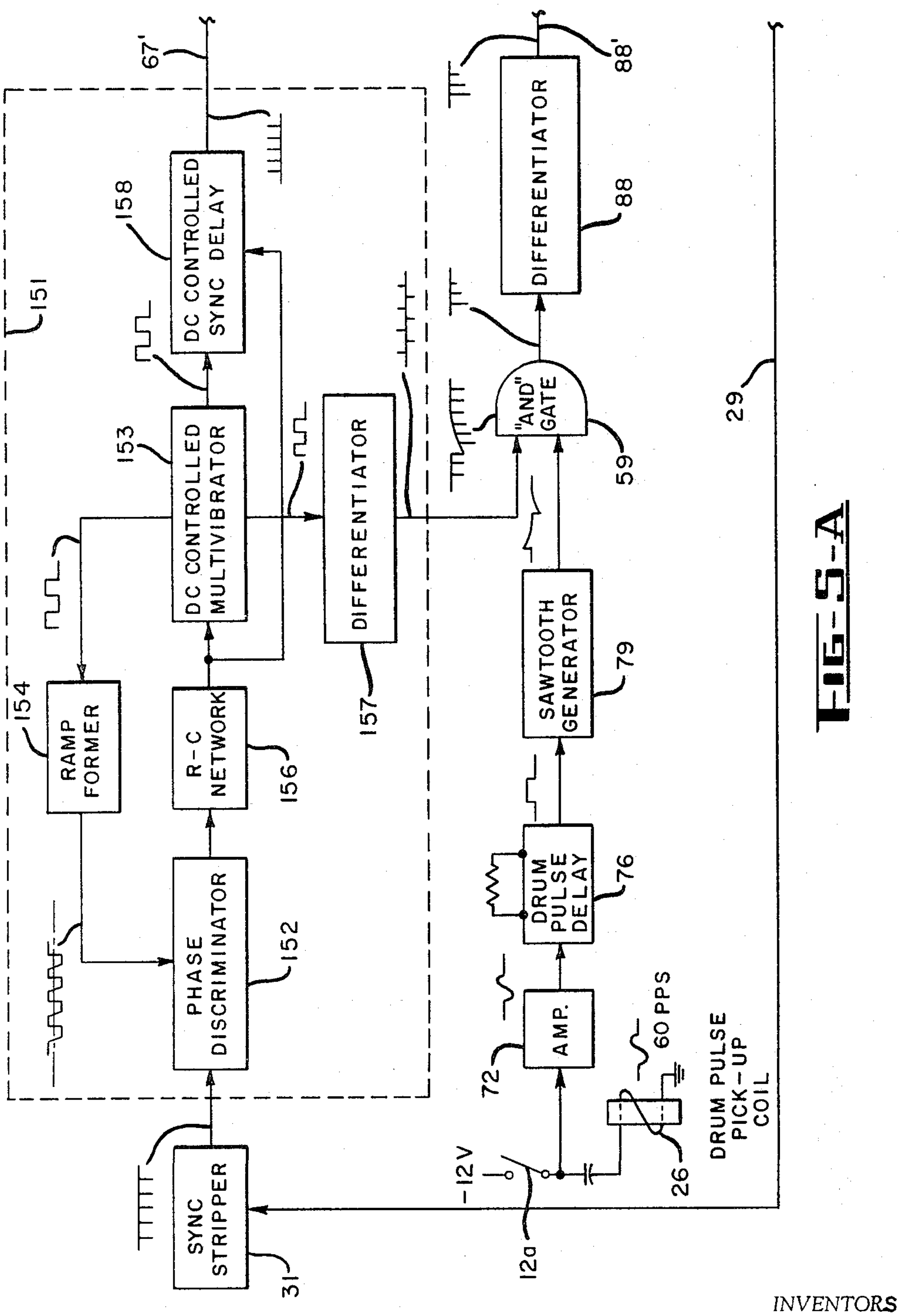
FIG-5-A
INVENTORS
ARTURO E. STOSBERG
WILLIAM F. GOODELL
BY Edward B. Gregg
ATTORNEY

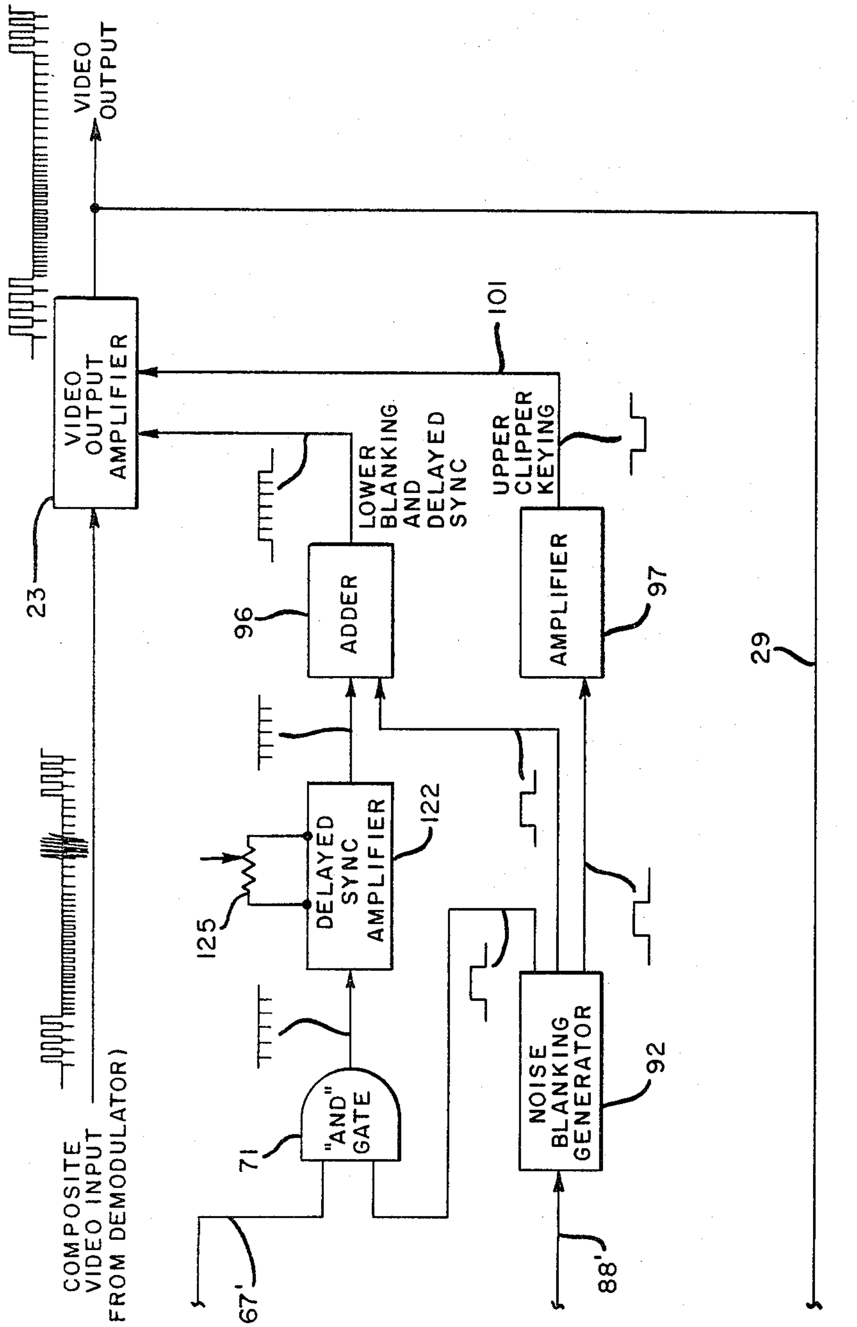
FIG-5-B
INVENTORS
ARTURO E. STOSBERG
WILLIAM F. GOODELL
BY Edward B. Gregg
ATTORNEY United States Patent Office 3,383,463

Patented May 14, 1968

3,383,463

SIGNAL PROCESSING FOR REPRODUCING MAGNETICALLY RECORDED TELEVISION SIGNALS

William F. Goodell, Milpitas, and Arturo E. Stosberg, Palo Alto, Calif., assignors to Machtronics, Inc., Palo Alto, Calif., a corporation of California Filed Aug. 17, 1964, Ser. No. 389,902
5 Claims. (Cl. 178—7.5)

ABSTRACT OF THE DISCLOSURE

Apparatus for processing a composite video signal which signal includes a noise signal occurring during a portion of the vertical blanking interval. The apparatus includes means for eliminating the horizontal synchronizing and noise signals from the vertical blanking signal during the portion of the vertical blanking interval during which the noise signal occurs. Also, means are included for adding a delayed horizontal synchronizing signal to the vertical blanking signal during that portion of the vertical blanking signal that the horizontal synchronizing signal is eliminated whereby none of the synchronizing pulses are lost by reason of the noise eliminating operation.

*Description*

This invention relates to a recording and reproducing apparatus which includes a system for eliminating undesired noise signals from the reproduced signal and reinserting synchronization signals which are removed with the removal of the said noise signals.

In well known recording and reproducing apparatus of the type commonly described as helical or transverse type recorders, a rotary member such as a circular disc having two or more magnetic heads is arranged to sweep across a moving magnetic tape to record a signal on successive tracks therealong. To reproduce the signal from the magnetic tape, the heads are made to accurately retrace the transverse tracks. In one arrangement the heads are connected to individual commutator segments carried by the rotary member. A brush contacts the segments in succession as the rotary member is driven thereby switching the input from one head to the next during record and similarly switching the output from one head to the next during playback. During such switching operations on both record and playback undesired transient noise signals are produced. Often in video tape recording and reproducing, a complete single frame of the video signal is recorded along each track on the magnetic tape; the rotary member being controlled to rotate so that a magnetic head thereon traverses each track during the time period of a single frame of a video signal. The commutator switching operation, and accompanying undesired transient noise signals are positioned to occur during the vertical blanking interval. Therefore, when the video signal from the recorder is fed to a conventional television receiver or monitor such noise signals appear across the entire screen during vertical retrace. In addition, the transient signals may disrupt the horizontal synchronizatioin signal causing the horizontal oscillator in the television receiver or monitor to drift off frequency.

It is an object of this invention to remove such undesired transient noise signals from the reproduced signal during playback.

In accordance with a described embodiment of the invention, signals are produced in synchronism with the rotation of the rotary member and are employed to eliminate both the positive and negative going excursions of the transient signals in the video output amplifier of the recording and reproducing apparatus. Since the horizontal synchronization signals are also removed by such noise eliminating signal, they must be properly reinserted in the reproduced video signal.

It is another object of this invention to add delayed horizontal synchronizing pulses to the composite video signal during the noise suppression period whereby none of the synchronizing pulses are lost by reason of the noise eliminating operation.

The apparatus of this invention includes means responsive to the video output from the recording and reproducing device for the production of delayed synchronization pulses. A blanking signal is generated in timed relation with the rotation of the rotary member and the delayed synchronization pulses are combined therewith. The combined blanking and delayed synchronization signal is applied to the video output amplifier to blank the transient signal and to insert the delayed synchronization pulses. Simultaneously, a clipper is keyed by the blanking signal to clip the noise signal during such noise blanking operation.

If the signals to be recorded have a fixed horizontal synchronization frequency, the means for generating delayed synchronization pulses in the apparatus may be provided with a fixed time delay for generation of such delayed pulses at a fixed time following receipt of a syncrhonizing pulse at the input thereto. In one embodiment of the invention such a fixed time delay means is shown. Where, however, the recording apparatus is used to record composite video signals having different horizontal synchronization frequencies, it will be apparent that such a fixed time delay means will provide proper frequency synchronization pulses for one frequency only. Therefore, in accordance with another embodiment of this invention, an automatic variable delay circuit is employed for generation of delayed synchronizing pulses of the same frequency as the recorded synchronization pulses regardless of the frequency of such recorded synchronization pulses.

The invention and other objects and advantages thereof will become apparent from the following description when read in connection with the drawings. In the drawings wherein like reference characters refer to the same parts in several views:

FIGURES 1A and 1B together show a simplified block diagram of a video recording/reproducing apparatus including the novel blanking, clipping and synchronization reinsertation system of this invention;

FIGURE 2 is a plan view of a rotary member having a pair of magnetic video heads utilized in the embodiment of the invention shown in FIGURE 1;

FIGURES 3A through 3E taken together show a schematic circuit diagram of the novel system shown in block form in FIGURES 1A and 1B;

FIGURES 4A and 4B show a graph illustrating the time relation of various wave forms occuring in the circuit shown in FIGURES 3A through 3B; and FIGURES 5A and 5B show a diagram which is similar to FIGURES 1A and 1B but showing a modified system embodying this invention which includes means for automatically controlling the frequency and phase of the delayed synchronization pulses.

Reference is first made to FIGURES 1A and 1B of the drawings wherein there is shown a magnetic tape recording and reproducing apparatus for the recording and/or reproduction of a composite video signal. The composite video input signal, which may be derived from any suitable source such as a television camera or a television receiver, is fed through a modulator 10 and amplifier 11 to a switch 12. When the switch is switched to the record position, the output from the amplifier 11 is connected therethrough to a stationary brush 13.

As seen in FIGURE 2, the rotary member 14 is a disc or narrow drum having two magnetic heads 16*a* and 16*b* secured at opposite ends of a diameter of said disc, each head being capable of recording or reproducing a video signal on the magnetic tape 17. The rotary member is driven by a synchronous motor 18 (FIGURE 1) connected to an A.C. power source. The brush 13 contacts a commutator comprising segments 19*a* and 19*b* attached to rotate with the disc, and which segments are connected to the individual magnetic heads. With the switch 12 in the record position, video information from the amplifier 11 is applied to the heads 16*a* and 16*b* alternately during each cycle of rotation of the rotary member 14. The magnetic tape 17 is caused to move along its length by a capstan (not shown) so that each magnetic head traverses consecutive diagonal tracks on the magnetic tape to record a single frame of a modulated composite video signal on each track. A suitable tape drive and associated mechanism which may be employed for recording and reproducing information on a series of diagonal bands across the tape is shown in a copending patent application of Perry Alan Bygdnes, Ser. No. 241,789, filed Dec. 3, 1962, entitled, "Tape Recorder," and assigned to the same assignee as this invention.

On playback the magnetic heads 16*a* and 16*b* sweep across the band of information recorded on the tape, and the reproduced modulated composite video signal from the heads is supplied to the commutator segments 19*a* and 19*b*. From the commutator, the signal is picked up by the brush 13 and supplied as an input to an amplifier 21 through the switch 12 in the illustrated playback position. The amplified signal from the amplifier 21 is demodulated by a demodulator 22 and supplied through conductor 22′ to a video output amplifier 23. The video output from the amplifier 23 may be applied to any desired utilization circuit such as a television receiver or monitor. The modulator 10, amplifiers 11 and 21 and demodulator 22 may be of any suitable design and no further description thereof is included herein. Also, although not shown in the drawings, it is well understood that the rotation of the disc 16 is synchronized with a reference signal so that a complete video frame is recorded or reproduced from each track on the tape. A suitable synchronizing system is shown in a copending patent application of Kurt R. Machein and Uwe W. Reese, Ser. No. 257,483, filed Aug. 15, 1963, now Patent No. 3,277,226, entitled "Phase Control System," and assigned to the same assignee as this invention.

As contact of the pick up brush 13 is transferred from one commutator segment to the other, a broad-band noise is generated which noise exists within the band pass of the electronic circuitry. Since it is broad-band noise it cannot be filtered out without deterioration of the video signal. Also, it will be apparent that the noise signal is generated both during record and playback since the illustrated brush and commutator arrangement is employed during both operations.

Reference is made to FIGURE 4A wherein the wave form A in a series of wave forms shown therein illustrates a portion of a typical composite video signal including the last few lines of the video picture information in a first field, the vertical blanking pulse, the first set of six equalizing pulses, the serrated vertical synchronization pulse, the second set of six equalizing pulses, a plurality of horizontal synchronization pulses, and the first few lines of the video picture information in the second field. The undesired switching transient (which is produced when the brush 13 transfers from one commutator segment to the other) is shown as occurring during the vertical blanking interval intermediate the vertical synchronization pulse and the second working field of video picture information. The noise may reach the white level of the video signal and, if the signal is fed into a monitor or television receiver, it may appear over much of the screen during vertical fly-back. Further, the horizontal synchronization pulses are disrupted by the transient switching signal noise and may cause the horizontal oscillator in the television receiver or monitor to drift off frequency.

In accordance with this invention, means are provided during the transient switching period to suppress the noise signal, which means includes a clipping pulse and a blankink pulse shown in the wave form B of FIGURE 4A. The upper clipping signal of several horizontal lines duration is brought down from above the white level to the blanking level, and the lower blanking pulse is brought up from below the synchronizing level to the blanking level to thereby suppress both the positive and negative excursions of the transient switching signal from said blanking level. In the wave form B of FIGURE 4A the upper clipping and lower blanking pulses are depicted slightly above and below, respectively, the blanking level for purposes of illustration. It will be seen that the lower blanking signal also suppresses the horizontal synchronization pulses within the blanking interval. This is desired since such synchronizing pulses are distorted by the transient signal. Therefore, as shown in wave form B of FIGURE 4A delayed horizontal synchronization pulses are reinserted in the composite video signal during the blanking operation to preserve the synchronization signal. The upper clipping signal pulse is shown at wave form C, the lower blanking signal pulse at wave form D, the delayed synchronizing signal and at wave form E and the combined lower blanking signal and delayed synchronizing signal are shown at wave form F in FIGURE 4A. The composite lower blanking signal and delayed synchronization signal shown in FIGURE 4A at wave form F together with the upper clipping signal C are applied to the reproduced composite video signal to override the transient signal and to supply horizontal synchronization pulses during the blanking interval.

It will be apparent that the undesired transient noise signals occur at a rate directly related to the rate of rotation of the drum or disc 14, with two noise signal pulses being generated for each revolution of the drum. As seen in FIGURE 2, a drum pulse pick up coil 26 is positioned adjacent the drum, and a pair of permanent magnets 27 are attached to one surface of the drum at opposite ends of a diameter. When the magnets pass the pick up coil 26 a positioning pulse is induced in the coil. It will be seen that two drum positioning pulses and two transient noise signal pulses are generated each revolution of the drum. With the drum rotating counterclockwise, in the direction of the arrow 28, it will be seen that the generation of drum positioning signal pulses, (wave form G of FIGURE 4B) precedes the transient noise signal pulses, and a comparison of wave forms A and G of FIGURE 4 shows the drum pulse occurring approximately nine horizontal lines or synchronization pulses prior to the transient noise pulse.

The drum positioning pulses, together with delayed horizontal synchronization pulses are employed in the generation of the upper clipping and lower blanking signals. Circuitry for forming these signals and delayed horizontal synchronization signals is shown in FIGURES 1A and 1B and in more detail in FIGURES 3A through 3E. As described above with reference to FIGURES 1A and 1B, with the switch 12 in playback position, the recorded modulated composite video signal on the tape 17 is picked up by the heads 16*a* and 16*b* and fed to the amplifier 21 through the commutator and brush arrangement. The signal is then demodulated and the demodulated composite video signal from the demodulator 22 (which includes the undesired transient noise signal) is fed to the video output amplifier 23.

The output from the video output amplifier 23 is fed through a conductor 29 to a sync stripper or separator 31 where the video information is removed from the synchronization pulses. The sync stripper may be of any conventional design. In FIGURE 3A a sync stripper is shown comprising differential amplifier, amplifier, phase inverter and emitter follower stages 32, 33, 34 and 35, respectively. Wave form K of FIGURE 4B illustrates the output from the sync stripper.

The synchronizing pulses from the sync stripper 31 are fed through a conductor 38 (FIGURES 3A to FIGURE 3B) to the input of a first half-sync delay circuit 39 comprising a one shot multivibrator. Although any suitable one shot multivibrator may be employed for the half-sync delay circuit 39 a preferred circuit is shown in FIGURE 3B comprising the three transistors 41, 42 and 43. The first transistor is normally fully conducting, and with suitable value collector and emitter resistors 44 and 45 (of about 5.6 K and 3.3 K ohms, respectively, for example) connecting the collector and emitter electrodes to the respective +12 volt D.C. and −12 volt D.C. supply sources, the potential at the collector electrode is normally about 0 volt D.C. The collector electrode of the transistor 41 is connected to the base electrodes of the transistors 42 and 43 which are in a complementary symmetry emitter follower configuration. Therefore, when transistor 41 is in the normal conducting state, transistor 42 is cut off and capacitor 46 is charged through the transistor 43. When a negative going pulse is applied to the base electrode of the transistor 41 from the sync stripper 31, the transistor begins to cut off whereupon the collector potential rises toward +12 volt D.C. as the collector current decreases. This positive going potential is fed to the base electrodes of transistors 42 and 43 to cause them to conduct and cut off respectively. When the transistor 42 conducts upon application of the input pulse thereto, the positive going pulse at the emitter thereof is fed back through the capacitor 46 to the emitter electrode of the transistor 41 to aid in cutting it off. By this feed back arrangement, transistor 41 is cut off rapidly upon receipt of an input pulse thereto. With transistor 41 cut off the capacitor 46 will discharge through resistor 45 and the emitter collector circuit of the conducting transistor 42. A resistor 47 is included in the collector circuit to prevent excess current from being drawn through the transistor 42 in the event the output circuit is inadvertently grounded. The resistor is not required in the operation of the device but if one is used it is preferably of a low value. The transistor 41 will be maintained in a cut off condition for a predetermined time interval; the time interval depending upon the R-C time constant of the capacitor 46 and the above mentioned capacitor discharge path. When the emitter electrode of the transistor 41 reaches a sufficiently negative value the emitter to base junction is again biased in the forward direction whereupon the transistor again conducts. It will remain conducting until another input pulse is received at the base electrode thereof. A square wave signal is thereby produced at the interconnection of the emitters of the transistors 42 and 43 as illustrated by the wave form L of FIGURES 4B. The leading edge of the square wave is triggered by the synchronization pulses from the sync stripper 31 and the trailing edge depends upon the circuit constants of the multivibrator. The circuit components for the first half-sync delay circuit 39 are selected to provide a generally symmetrical square wave whereby the trailing edge of the wave occurs substantially midway between the synchronization pulses fed to the input thereof. The square wave signal is fed to R-C differentiators 51 and 52 comprising resistor 53-capacitor 54 and resistor 56-capacitor 57, respectively, for the generation of pulses by the leading and trailing edges of the square wave. Such pulses are shown in the wave form diagram M of FIGURE 4B.

From the differentiators 51 and 52, the pulses are fed to the input of a second half-sync delay circuit 58 FIGURE 3B) and to an "and" gate 59 (FIGURE 3D) through conductors 58′ and 59′, respectively. As seen in FIGURE 3B, the coupling to the second half-sync delay circuit includes a diode 61 poled to conduct the negative going pulses from the differentiator 51 but not the positive going pulses. Thus, only those pulses produced by the differentiation of the trailing edge of the square wave are fed to the second half-sync delay circuit to trigger the same. The second half-sync delay 58 comprises another monostable multivibrator which is substantially of the same construction as the first half-sync delay circuit 39, except, as seen in FIGURE 3B, the resistance in the discharge path for the timing capacitor 62 is made variable by inclusion of a potentiometer 63 therein. The square wave output from the second half-sync delay circuit 58 (shown as wave form N in FIGURE 4B) is differentiated by resistor 64 and capacitor 65 (the differentiated output being shown as wave form 0 in FIGURE 4B) and fed through conductor 66 to a sync shaper 67 (FIGURE 3C). As in the first half-sync delay circuit 39, only the pulses generated by the trailing edge of the square wave multivibrator output are employed in driving the shaper 67. The potentiometer 63 in the second half-sync delay circuit 58 (FIGURE 3B) is adjusted such that the delayed pulses occur one horizontal synchronization period after the initiating pulse from the sync stripper 31. As described hereinbelow, these delayed horizontal synchronization pulses are fed to the video output amplifier 23 during the noise blanking interval to be added to the composite video signal. During such blanking period, the delayed synchronization pulse will appear at the video output, and one delayed synchronization pulse at the output will be fed back to the sync separator 31 for generation of another delayed sync pulse. By this feed back arrangement delayed sync pulses are generated and present in the output of the video amplifier output during the entire noise blanking interval.

The sync shaper 67 (FIGURE 3C) includes a transistor 68 which is normally conducting, and the pulse output from the second half-sync delay circuit 58 is fed to the transistor through a diode 69. The negative going pulses (generated by the trailing edge of the square wave multivibrator included in the second half-sync delay circuit 58) function to cut off the transistor 68 whereupon positive going pulses are produced at the output of the shaper 67. As seen in FIGURE 3C and also FIGURES 1A and 1B, the positive going pulses are fed through conductor 67′ to and "and" gate 71 as one input thereto. The other input to the "and" gate comprises the noise blanking signal shown as wave form D as is seen in FIGURE 4A. Before describing the operation of the "and" gate 71 and subsequent circuitry, the source of the blanking signals will first be described.

As seen in FIGURES 1A and 3D, the drum positioning pulses (which are produced at a sixty pulse per second rate in the manner described above) are fed to an amplifier 72 for amplification thereof when the switch **12*a* is in the illustrated open, or playback position. When the switch 12*a* is closed during record, a −12 volt D.C. potential is applied to the base of the transistor amplifier to maintain the transistor in a cut off condition. During playback, the drum pulses (which are generated at a frequency dependent upon the speed of the rotation of the drum 14) are amplified and fed to a differentiator comprising the resistor 73 and capacitator 74 (FIGURE 3D). The drum pulse signal, as mentioned above, is shown in wave form G of FIGURE 4B and the amplified and differentated pulses are shown at wave form H thereof. The differentiated pulses are fed to a drum pulse delay circuit 76 through a diode 77. The drum pulse delay circuit 76 includes a monostable multivibrator of the type employed in the first and second half-sync delay circuits 39 and 58 described above. The negative going pulses from the drum pulse amplifier 72 are coupled through the diode 77 to the monostable multivibrator to trigger the same. The potentiometer 78** is adjusted whereby the trailing edge of the square wave output from the multivibrator occurs several horizontal sync pulse periods prior to the transient noise signal, as shown by a comparison of wave forms A and I of FIGURES 4A and 4B. The exact delay period is not critical in the operation of the circuit.

The rectangular-shaped output from the drum pulse delay circuit 76 (FIGURES 1A and 3D) is applied to a sawtooth wave former 79 comprising a differentiating circuit which includes a resistor 81 and a capacitator 82. The time constant R-C of the resistor 81 and capacitator 82 is equal to about the time interval between adjacent horizontal sync pulses. The sawtooth wave former thereby produces a sawtooth wave form with sloping lines commencing at the leading and trailing edges of the rectangular drum pulse delay output from the delay circuit 76. The sawtooth wave form (shown at wave form J of FIGURE 4B) is fed to the "and" gate 59 to control the opening and closing thereof.

The "and" gate 59 (FIGURES 1A and 3D) is thereby provided with delayed horizontal synchronization pulses (wave form M of FIGURE 4B) and the sawtooth wave form J of FIGURE 4B. The "and" gate includes interconnected diodes 83 and 84 to which the said sawtooth wave gating signal and the half-delayed synchronization pulses respectively are fed. The interconnection between the diodes is connected to the negative 12 volt D.C. supply source through a resistor 86 and to the base electrode of a gate amplifier transistor 87. Both diodes are poled to normally conduct. With positive going signals applied to either or both inputs, the diodes remain conducting and the potential at the junction between the diodes remains substantially constant to about −.5 volt D.C. With a negative going input at one of the diode inputs to the gate, but not at the other, the one diode receiving the input is back biased and therefore non-conducting. The other diode, however, continues to conduct whereby the potential at the junction remains substantially constant. Finally, with a negative going signal at both diodes 83 and 84, both doides are biased toward the non-conducting state whereupon the potential at the junction between the diodes increases in the negative direction.

The transistor 87 is normally cut off by a reverse emitter-to-base bias, and remains cut off until the negative sawtooth wave form from the sawtooth generator 79 coincides with negative going synchronization pulses from the first half-sync delay circuit 39 (FIGURES 1A and 3B). The sawtooth and half-sync delay pulse signals which are fed to the gate 59 are shown together at wave form P in FIGURE 4B, where it will be seen that several delay sync pulses occurring during the sawtooth wave may exceed the trigger level of the transistor 87 causing the same to conduct. The output pulses from the gate 57 (at the collector electrode of the gate transistor 87) are shown at wave form Q in FIGURE 4B.

The pulses from the gate 59 (FIGURES 1A and 3D) are sharpened in a peaker circuit 88 comprising a resistor 89 and capacitor 91, and from there are fed to a noise blanking generator 92 (FIGURES 1B and 3D) through a conductor 88′ and a diode 93. The noise blanking generator 92 comprises a monostable multivibrator which may be of the same type employed in the first and second half-sync delay circuits 39 and 58, and the drum pulse delay circuit 76 described above. The output from the generator 92 comprises a rectangular wave as shown at D in FIGURE 4A. The first output pulse from the peaker circuit 88 triggers the monostable multivibrator whereupon the normally conducting multivibrator transistor 94 is cut off. Thus, the leading edge of the blanking signal coincides with the first pulse from the peaker circuit. Subsequent pulses from the peaker circuit to the input of the multivibrator obviously have no effect thereon so long as the transistor remains cut off.

The circuit components of the multivibrator of the noise generator 92 are selected to provide a blanking signal equal in time to an integral number of horizontal lines. A clamping signal having a width equal to five horizontal lines is shown at wave form D in FIGURE 4A. Since the leading edge of the blanking signal is triggered midway between two horizontal synchronizing pulses by an output derived from the first half-sync delay circuit 39, the trailing edge of the blanking signal likewise occurs midway between two horizontal synchronization pulses. By this means and for this reason, the blanking signal which is subsequently added to the composite video signal at the video output amplifier 23 will not interfere or distort synchronization pulses fed thereto. It will be apparent that the precise width of the blanking pulse is not critical; it only being necessary that the edges thereof do not distort the synchronization pulses, and that the duration is sufficient to blank the undesired noise signal.

The output from the noise blanking generator 92 (FIGURE 3D) is fed through conductors 71′, 96′ and 97′ to three different circuits including the "and" gate 71, an adder 96 and an amplifier 97 shown in FIGURE 3C; the connection to the adder 95 being made through a voltage divider network 95. The amplifier 97 includes a single NPN type transistor 98 connected in a common emitter configuration. The positive going blanking pulses at the input thereto therefore appear as negative going pulses at the output therefrom; the positive pulses turning on the normally cut off transistor 98. When the transistor 98 conducts, the potential at the collector drops to about zero volts from a positive potential of about 12 volts.

The signal from the amplifier 97 comprises a negative keying signal for periodically keying a clipper circuit in the amplifier 23. This keying or switching signal is coupled through a capacitor 99 and conductor 101 (FIGURES 3C to FIGURE 3E) to the video output amplifier 23.

In general, the video output amplifier 23 (FIGURE 3E) may be of any well known design. In the illustrated arrangement it is shown including a broad band amplifier comprising transistors at 103 and 104 to which the composite video signal from the demodulator 22 (FIGURE 1A) is fed. From there, the signal is fed through a pair of emitter follower stages which include transistors 106 and 107, and from thence to a power output stage which includes transistors 108 and 109. As described above, a portion of the output signal from the video output amplifier (FIGURE 3E) is fed through conductor 29 to the input of the sync separator 31 (FIGURE 3A); the conductor 29 being traceable from FIGURE 3E, through FIGURES 3C and 3B, to FIGURE 3A.

The output from the amplifier 97 is connected through the lead wire 101 as mentioned above to a diode 111 comprising a shunt clipper. The diode clipper is connected to the input, or base electrode of the transistor 106 to which the composite video signal is fed from the transistor 104, for clipping the composite video signal when the clipper is keyed by an output pulse from the amplifier 97.

Base collector bias for the transistor 106 is provided by a voltage divider network comprising resistors 112 and 113 and potentiometer 114 connected between the +12 volt D.C. supply and ground. The collector electrode is connected to the junction between the resistors 112 and 113, which junction is maintained at about +12 volts; the resistor 112 being of a small value on the order of 10 ohms.

The clipper diode 11 is connected to the junction between the resistor 113 and potentiometer 114 through a large resistor 116. Without a keying signal from the amplifier 97, the junction between the resistors 113 and potentiometer 114 is maintained at about +6 volt D.C. A second diode clipper comprising the diode 117 is included to clip the keying signal from the amplifier 97 to the clipper diode 111 to prevent the same from exceeding (in a negative direction) the pedestal or blanking level of the composite video signal at the input to the transistor 106. The diode 117 is connected to the movable arm of the potentiometer 114 and the potentiometer is set to the pedestal or blanking level which, in the illustrated circuit is about +1 volt D.C. The diode 117 conducts whenever the keying signal for the clipper diode 111 drops to the pedestal level. This shunt clipped keying signal is periodically applied to the clipper diode 111 to set the clipping level thereof at the blanking signal level of the composite wave form. The positive going excursions of the noise signal in the composite video signal are thereby clipped at the blanking signal level as seen at wave form B in FIGURE 4. In brief, the diode 117 clips the keying signal for the diode 111 at the blanking level, and diode clipper 111 clips the composite video signal at the blanking level.

Besides the clipper keying signal, the noise blanking signal is also derived from the noise blanking generator 92. In addition, the noise blanking generator output is fed to the "and" gate 71 which is also supplied with delayed horizontal synchronization pulses from the second half-sync delay circuit through the sync shaper 67. The "and" gate 71 is keyed open by said noise blanking signal whereby the output from the gate comprises delayed synchronization pulses which are present only when a noise blanking signal is generated. As seen in FIGURE 3C, the "and" gate 71 includes a normally conducting transistor 118 which is triggered to an off condition only when both delayed synchronization pulses and the noise blanking signal are applied to the control or base electrode thereof. The positive going delayed sync pulses from the shaper 67 and the positive going noise blanking signal from the generator 92 are fed through resistors 119 and 121, respectively, to the control or base electrode of the transistor 118. If only positive going delayed synchronization pulses, or only noise blanking signal pulses, but not both, are applied to the gate 71, the base collector remains biased in the forward direction and the transistor 118 continues to conduct. However, with synchronization signal pulses and a noise blanking signal pulse both applied to the gate simultaneously, the transistor 118 is cut off and negative going delayed sync pulses appear at the output, or collector electrode of the transistor 118.

From the "and" gate 71 the delay synchronization pulses occurring during the noise blanking signal are coupled through a capacitor 123, to delayed synchronization amplifier 122. A diode clipper is included in the input of the amplifier which clipper includes the diode 124, potentiometer 125 and capacitor 126, to set the negative level of the delay sync pulses. The delayed sync pulses are then amplified by the emitter follower transistor 127 circuit which has a low output impedance, and from there are fed to the adder 96.

At the adder 96, the delayed sync pulses (wave form E of FIGURE 4A) are added to the lower noise blanking pulse (wave form D of FIGURE 4A). The negative going delayed synchronization pulses and positive going lower blanking pulses are combined (as shown at wave form F of FIGURE 4A) through diodes 131 and 132 in the adder, and fed to the video output amplifier through the conductor 133 (from FIGURE 3C to FIGURE 3E). The combined delayed synchronization and blanking signal is applied to the input electrode of the transistor emitter follower 106 (FIGURE 3E) to blank out the negative going excursions of the undesired transient noise signal and to reinsert the horizontal synchronization pulses which are blanked out during the blanking interval by said lower noise blanking pulse. The upper noise clipper keying pulse is simultaneously applied to the diode clipper 111 at the input electrode of the transistor 106, as described above, to clip the positive going excursions of the undesired noise signal at the same time. The output from the video output amplifier 23 thereby comprises the amplified input thereto but with the transient noise signal suppressed by clipping and blanking and with delayed horizontal synchronization pulses added thereto during such blanking interval.

In the arrangement illustrated in FIGURES 1A and 1B and FIGURES 3A through 3E the delayed horizontal synchronization pulses are produced by simply delaying the synchronization pulses from the sync stripper a fixed predetermined amount equal to the sync pulse period. If, however, the horizontal sync pulse rate varies, the sync delay circuits are provided with no means for sensing such change and consequently the reinserted delayed synchronization pulses occur at a rate which differs from the rate of the synchronization pulses of the video signal. There is a small difference in the horizontal synchronization frequency of a black and white video signal and a color video signal for example, and the apparatus shown in FIGURES 1A and 1B and FIGURES 3A through 3E would not function properly with both signals without adjustment of the synchronization frequency adjust potentiometer 63 in the second half-sync delay circuit 58 (FIGURES 1A and 3B). A circuit which automatically adjusts for changes in the horizontal synchronization frequency as shown in FIGURES 5A and 5B to which figures reference is now made.

The circuit of FIGURES 5A and 5B is the same as that shown in FIGURES 1A and 1B except that the first and second half sync delay circuits 39 and 58 and the sync shaper 67 (FIGURE 1A) are replaced by the automatic frequency and phase control circuit 151 (FIGURE 5A) for the production of delayed synchronization pulses of the same frequency and having the same phase as the horizontal synchronization pulses from the stripper 31. As shown in FIGURE 5A, the circuit includes a phase discriminator 152 which receives horizontal synchronization information at one input thereto from the sync stripper 31. A second input to the phase discriminator is obtained from a frequency controlled oscillator 153 through a ramp former or sawtooth generator 154. As is well understood by those skilled in this art, the oscillator 153 may be of the free running multivibrator type having a nominal operating frequency equal to the horizontal synchronization frequency of the sync stripper. The square wave output from the multivibrator 153 is reformed by the ramp former 154 to have a gradual slope from one extreme to the other. If the horizontal sync pulses from the sync stripper 31 occur while the sawtooth wave passes through its A.C. axis, no output is obtained from the discriminator 152 and the frequency of the multivibrator is unaffected. If the oscillator frequency is too high or too low, an output is obtained from the phase detector or discriminator and fed to the multivibrator 153 through an R-C network 156 to lower or increase the frequency thereof as required. The circuit which includes the phase discriminator 152, multivibrator 153, ramp former 154 and network 156 comprises a well known "flywheel generator" of the type often used in the horizontal generator circuit of conventional television receivers, and no further explanation thereof is believed to be required.

The multivibrator output is fed through a differentiator 157 to the "and" gate 59 to supply the necessary delayed sync pulse input thereto. As is understood, although the frequency of the multivibrator 153 is locked to the frequency of the sync signal from the sync stripper 31, there exists a phase difference between such signals. Because of this phase difference, the differentitated multivibrator output is well suited for triggering the noise blanking signal generator through the differentiator 157, "and" gate 59 and differentiator 88. The phase difference is, however, variable depending upon the error signal from the phase discriminator 152. Therefore, sync pulses from the multivibrator 153 cannot be applied to the "and" gate 71 without first correcting for this variable delay.

To provide for the proper delay, the multivibrator output is fed through a D.C. controlled sync delay circuit 158 which may comprise, for example, any well known monostable multivibrator having a shot, or delay, time which may be voltage controlled. A monostable multivibrator of the type employed in the half-sync circuits 39 and 58 shown in FIGURES 1A and 3B and described above may be employed in which the bias voltage on the base of the input transistor is controlled. The circuit components are selected such that the output of the multivibrator 158 is in phase with the output from the sync stripper 31. To compensate for errors arising from the variable phase angle between the signal from the multivibrator 153 and the horizontal sync signal to the input of the automatic frequency control circuit, a control signal is supplied to the sync delay circuit 158 from the R-C network 156 to vary the delay thereof in accordance with said control signal. That is, the time interval between the leading and trailing edges of the multivibrator 153 is variable by the control signal from the R-C network 156. By this means, both the frequency and phase of the delayed snychronization pulses from the sync delay circuit 158 are automatically controlled in accordance with the input signal to the circuit 151 from the sync stripper. The remainder of the circuit is the same as that shown in FIGURES 1A and 1B and no further explanation thereof is believed to be required. For simplicity, the circuitry for providing a composite video input signal to the video amplifier is not shown in FIGURES 5A and 5B but it will be understood that the tape recorder and reproducer shown in FIGURES 1A and 1B may supply such input.

As is well understood, the wave forms including the composite video signal are shown and described with reference to particular points in illustrated circuitry. The invention is not limited to the various signal levels nor to the signal polarities shown. Also, the terms "upper" and "lower" clipping and blanking pulses or signals, respectively, are for purposes of description, the invention not being limited to negative going "upper" clipping pulses and positive going "lower" noise blanking pulses.

Having now described the invention in detail in accordance with the requirements of the patent statutes, various other changes and modifications will suggest themselves to those skilled in this art and it is intended that such changes and modifications shall fall within the spirit and scope of the invention as recited in the following claims.

We claim:

1. Apparatus for processing a composite video signal which includes a vertical blanking signal, a horizontal synchronizing signal and a noise signal occurring during a portion of the vertical blanking interval, said apparatus comprising means eliminating the horizontal synchronizing and noise signals from the vertical blanking signal during a portion of the vertical blanking interval during which the noise signal occurs, and means adding a delayed horizontal synchronizing signal to the vertical blanking signal during that portion of the vertical blanking signal that the horizontal synchronizing signal is eliminated.

2. Apparatus for processing a composite video signal which includes a vertical blanking signal, a horizontal synchronizing signal and a noise signal occurring during a portion of the vertical blanking interval, said apparatus comprising means clipping the noise signal to prevent excursions thereof in one direction from the level of the vertical blanking signal, means blanking the noise signal to eliminate excursions thereof in the other direction from the level of the vertical blanking signal, said last mentioned means also blanking the horizontal synchronizing signal, and means adding a delayed horizontal synchronizing signal to the blanking means to restore the blanked out horizontal synchronizing signal.

3. In apparatus for reproducing a modulated composite video signal which includes blanking and synchronizing signals recorded on tracks across a magnetic tape, said apparatus including a rotary member carrying magnetic heads movable across said tape for scanning the tracks to reproduce said composite video signal, a demodulator, means including a commutator and brush assembly for connecting the magnetic heads to said demodulator in sequence whereupon a recurring noise signal is generated during the blanking signal by transfer of the brush from one commutator segment to another, a noise suppressing system for suppressing said noise signal comprising: means periodically clipping the composite video signal from the demodulator at substantially the level of the video blanking signal during the noise signal to remove noise signal excursions in one direction from the video blanking level, means periodically adding a noise blanking signal to the composite video signal from the demodulator having a blanking level substantially equal to the level of the video blanking signal to blank out noise signal excursions in the other direction from the video blanking level, means for separating said synchronizing signal from the composite video signal after said noise blanking signal is added thereto, means for delaying said synchronizing signal derived from the separating means, and means adding said delayed synchronizing signal from the delaying means to said composite video signal when the noise blanking signal is added thereto to restore a portion of the synchronizing signal blanked out by the blanking signal.

4. In apparatus for reproducing a modulated composite video signal which includes blanking and synchronizing signals recorded on tracks across a magnetic tape, said apparatus including a rotary member carrying magnetic heads movable across said tape for scanning the tracks to reproduce said composite video signal, a demodulator, means including a commutator and brush assembly for connecting the magnetic heads to said demodulator in sequence whereupon a recurring noise signal is generated during the blanking signal by transfer of the brush from one commutator segment to another, a noise suppressing system for suppressing said noise signal comprising: means periodically clipping the composite video signal from the demodulator at substantially the level of the video blanking signal during the noise signal to remove noise signal excursions in one direction from the video blanking level, means periodically adding a noise blanking signal to the composite video signal from the demodulator having a blanking level substantially equal to the level of the video blanking signal to blank out noise signal excursions in the other direction from the video blanking level, means generating positioning pulses at a frequency dependent upon the speed of rotation of said rotary member, positioning pulse delay means for delaying said positioning pulses, and means under control of said delayed positioning pulses for keying said clipping means and generating said noise blanking signal for clipping and noise blanking when the noise signal is present in the composite video signal.

5. In apparatus for reproducing a modulated composite video signal which includes blanking and synchronizing signals recorded on tracks across a magnetic tape, said apparatus including a rotary member carrying magnetic heads movable across said tape for scanning the tracks to reproduce said composite video signal, a demodulator, means including a commutator and brush assembly for connecting the magnetic heads to said demodulator in sequence whereupon a recurring noise signal is generated during the blanking signal by transfer of the brush from one commutator segment to another, a noise suppressing system for suppressing said noise signal comprising: means periodically clipping the composite video signal from the demodulator at substantially the level of the video blanking signal during the noise signal to remove noise signal excursions in one direction from the video blanking level, means periodically adding a noise blanking signal to the composite video signal from the demodulator having a blanking level substantially equal to the level of the video blanking signal to blank out noise signal excursions in the other direction from the video blanking level, means for separating said synchronizing signal from the composite video signal after said noise blanking signal is added thereto, first synchronizing signal delay means for delaying the separated synchronizing signal less than a synchronizing signal period, second synchronizing signal delay means connected to receive the delayed synchronizing signal from the first synchronizing signal delay means, the delayed synchronizing signal output from the second delay means being delayed one synchronizing signal period from the output from said separating means, means generating positioning pulses at a frequency dependent upon the speed of rotation of said rotary member, positioning pulse delay means for delaying said positioning pulses, first gate means connected to receive the delayed positioning pulses and the delayed synchronizing signal from the first synchronizing signal delay means to provide a trigger out when the gate is opened by said delayed positioning pulses, means under control of the trigger from the first gate means for keying said clipping means and generating said noise blanking signal for clipping and noise blanking operations, second gate means connected to receive the delayed synchronizing signal from the second synchronizing signal delay means and an output from the means under control of the trigger from the first gate to provide a delayed synchronizing signal output when the gate is opened, and means adding the delayed synchronizing signal from the second gate means with the noise blanking signal before adding the noise blanking signal to the composite video signal.

References Cited

UNITED STATES PATENTS

| | | | |
|---|---|---|---|
| 3,235,892 | 5/1967 | Kihara | 178—6.6 |
| 3,322,892 | 5/1967 | Yasuoka | 178—6.6 |

ROBERT L. GRIFFIN, *Primary Examiner.*

JOHN W. CALDWELL, *Examiner.*

H. W. BRITTON, *Assistant Examiner.*